United States Patent
Fan

[11] Patent Number: 5,427,148
[45] Date of Patent: Jun. 27, 1995

[54] THREE WAY FAUCET

[76] Inventor: Chen-Yueh Fan, 3Fl., No. 2, Alley 2, Lane 88, Sec. 2, Shui Yuan Rd., Hsi Chih Chen, Taipei Hsien, Taiwan

[21] Appl. No.: 237,836

[22] Filed: May 4, 1994

[51] Int. Cl.$^6$ ............................................. F16K 11/07
[52] U.S. Cl. ............................. 137/625.48; 137/597; 4/677
[58] Field of Search ................ 137/625.48, 597; 4/675, 4/676, 677

[56] References Cited

U.S. PATENT DOCUMENTS

| | | | |
|---|---|---|---|
| 3,232,308 | 2/1966 | Moen | 137/597 X |
| 3,245,430 | 4/1966 | Enterante | 137/597 X |
| 4,182,374 | 1/1980 | Spanides | 137/625.48 |
| 4,718,128 | 1/1988 | Fan | 137/625.48 X |
| 4,874,006 | 10/1989 | Iqbal | 137/597 X |

Primary Examiner—Martin P. Schwadron
Assistant Examiner—Kevin L. Lee
Attorney, Agent, or Firm—Morton J. Rosenberg; David I. Klein

[57] ABSTRACT

A faucet has a housing defining a cold water chamber, a hot water chamber, a first output chamber, a second output chamber, a first passage between the cold and hot water chambers, and a second passage between the hot water chamber and the second output chamber. A stem is disposed in the housing. First, second and third gaskets are mounted on the stem. The diameter of the first gasket is substantially identical to the diameter of the first output chamber and smaller than the diameter of the cold water chamber, the diameter of the second gasket is substantially identical to the diameter of the first passage and smaller than the diameter of the cold and hot water chambers, and the diameter of the third gasket is substantially identical to the diameter of the second passage and smaller than the diameter of the hot water chamber. In a first position, the first gasket is in the first output chamber, the second gasket is in the first passage, and the third gasket is in the second passage, isolating the chambers. In a second position, the first gasket is in the first output chamber, the second gasket is in the cold water chamber, and the third gasket is in the hot water chamber. Thus, the first output chamber is isolated and the cold and hot water chambers and the second output chamber are all in fluid communication. In a third position, the first gasket is in the cold water chamber, the second gasket is in the hot water chamber, and the third gasket is in the second output chamber. Thus, the second output chamber is isolated and the cold and hot water chambers and the first output chamber are all in fluid communication.

4 Claims, 6 Drawing Sheets

THREE WAY FAUCET

BACKGROUND OF THE INVENTION

1. Field of the Invention

The present invention relates to an improved structure for three way faucets.

2. Description of Related Art

U.S. Pat. No. 4,718,128 issued to the applicant discloses a three way faucet to avoid the problem of adjusting mixed water temperature. However, in such a design, when the faucet is in an OFF position and the control knobs of cold and hot water pipes are not in closed positions, the cold water and hot water still communicate with each other and sometimes the hot water will, due to convection, trace back to a water tower on a roof which thus heats the water in the water tower and causes further problems. A further drawback of such design is that noise may occur during positioning of the handle and such noise may be transmitted along the piping in the whole building and thus may disturb people in other apartments. The present invention is intended to provide an improved design to solve the above-mentioned problems.

SUMMARY OF THE INVENTION

A three way faucet provided by the present invention includes a housing defining therein a cold water inlet chamber which communicates with a cold water source, a hot water inlet chamber which communicates with a hot water source, a first water output chamber which communicates with a shower head, and a second water output chamber which communicates with a bathtub. A valve stem is mounted in the housing. When the valve stem is in a first position, all chambers are isolated from one another such that no water is outputted. When the valve stem is in a second position, the first water output chamber is isolated and the cold and hot water inlet chambers and the second water output chamber communicate with one another such that water is outputable to the bathtub. When the valve stem is in a third position, the second water output chamber is isolated and the cold and hot water inlet chambers and the first water output chamber communicate with one another such that water is outputable to the shower head.

Preferably, the cold and hot water inlet chambers are defined in a mediate section of the housing and the first and second outlet chambers are respectively defined in two ends of the housing.

In accordance with one aspect of the invention, the valve stem includes three spaced water sealing gaskets mounted thereon and each of the cold and hot water inlet chambers includes a recessed portion such that two chambers, which are respectively on two sides of a water sealing gasket which is received in an associated recessed portion, communicate with each other to allow water to flow therebetween thereby allowing water to be outputted to either the shower head or the bathtub, and that two chambers, which are respectively on two sides of a water sealing gasket which is not received in the recessed portion, are isolated from each other and water is not flowable therebetween.

In accordance with another aspect of the invention, the housing includes a seat attached thereto. The valve stem includes an end extending beyond the housing and a threaded section engaged with inner threadings in the seat. A knob is attached to the end of the valve stem and is rotationally operable between the first, second, and third positions to control output of water. Preferably, the knob includes an index (such as a notch) thereon for providing a reference to indicate the first, second, and third positions.

Other objects, advantages, and novel features of the invention will become more apparent from the following detailed description when taken in conjunction with the accompanying drawings.

DESCRIPTION OF THE PREFERRED EMBODIMENT

Figure 1:
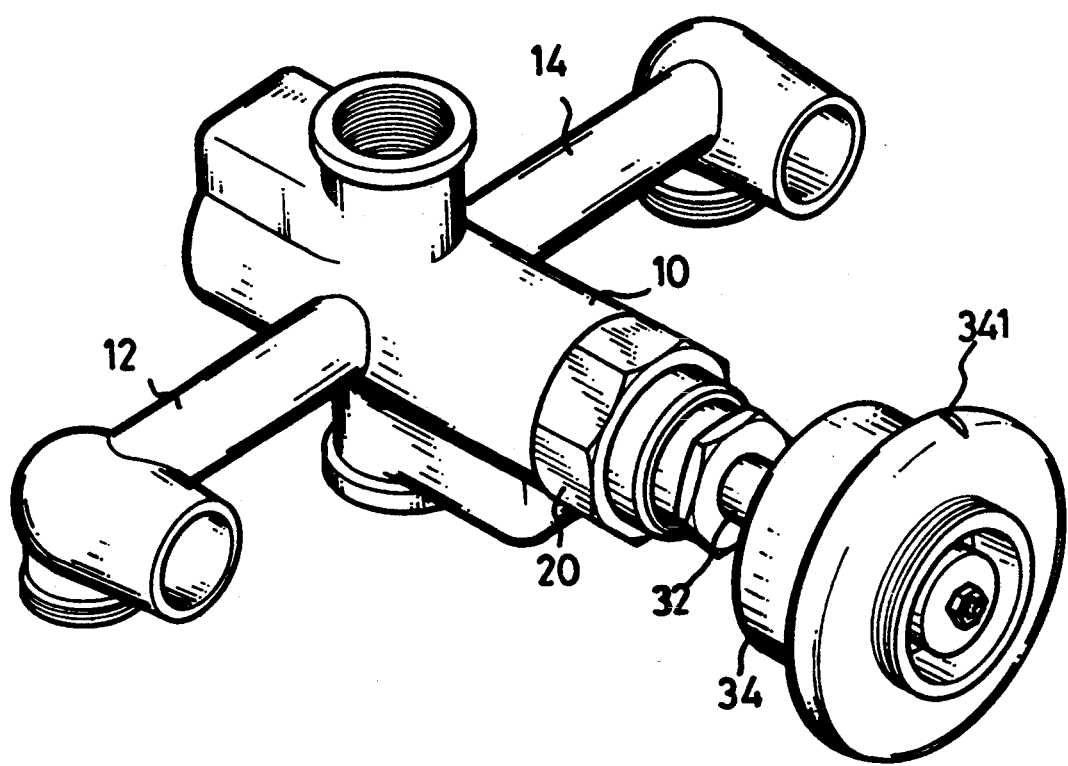
FIG. 1 is a front-top-left perspective view of a three way faucet in accordance with the present invention.
Figure 2:
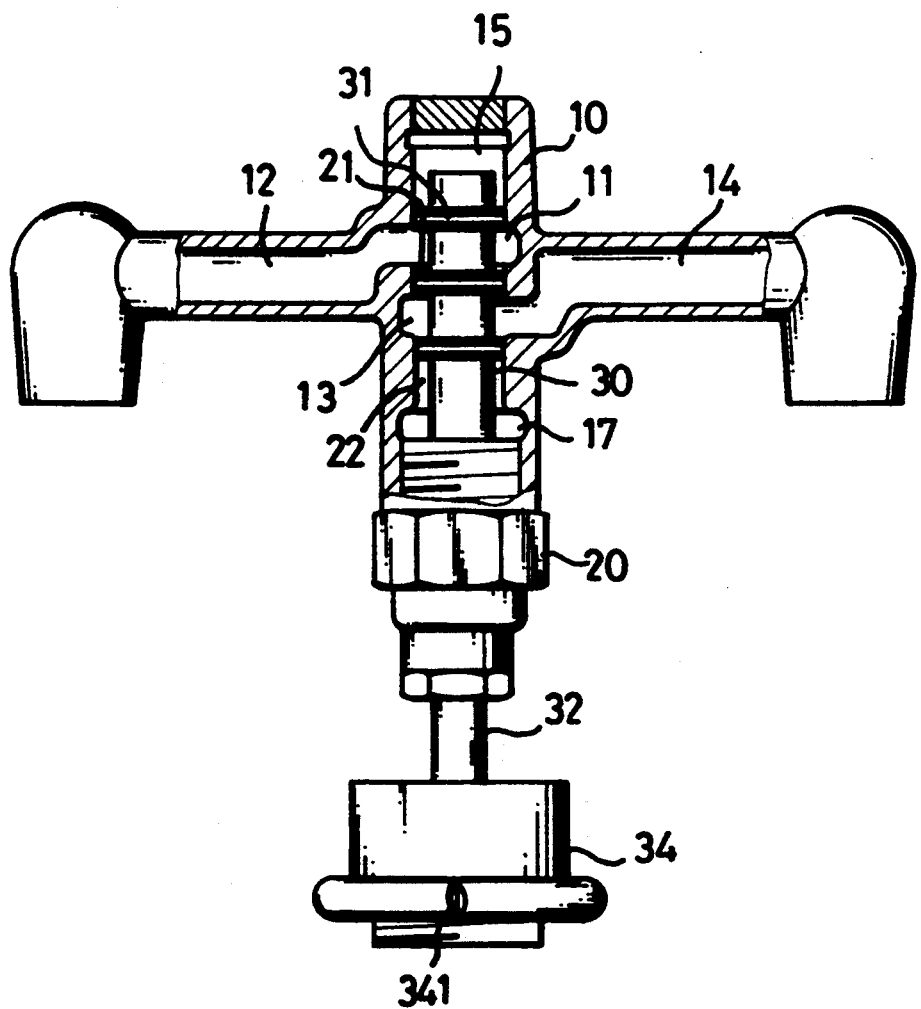
FIG. 2 is partially sectioned top plan view, of the three way faucet.
Figure 3:
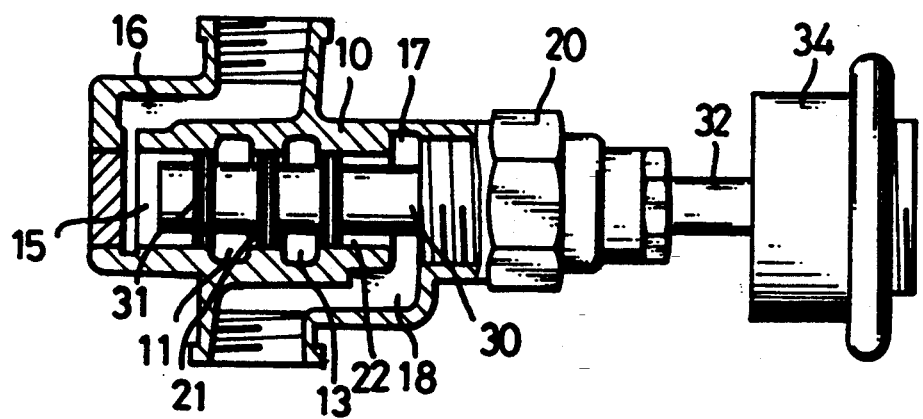
FIG. 3 is a left side elevational view, partly sectioned, of the three way faucet, in which the faucet is in an OFF position.

Referring to the drawings and initially to FIGS. 1 through 3, a three way faucet in accordance with the present invention includes a housing 10 with cold and hot water inlet pipes 12 and 14 communicated thereto for respectively communicating with cold and hot water sources (not shown). A control knob (not shown) is attached to an end of each of the cold and hot water inlet pipes 12 and 14 for controlling output thereof which is conventional and therefore is not further described. A valve stem 30 is received in the housing 10 with one end 32 thereof extending beyond the housing 10 and to which a control knob 34 is attached which will be further described hereinafter. It is appreciated that the three way faucet in accordance with the present invention has an appearance similar to those of conventional faucets used in bathrooms such that the present faucet can be directly mounted without the need of modification in the piping.

As shown in FIG. 2, the housing 10 defines therein a cold water inlet chamber 11 which communicates with the cold water inlet pipe 12, a hot water inlet chamber 13 which communicates with the hot water inlet pipe 14, a first water output chamber 15 which communicates with a shower head via a a passage 16, and a second water output chamber 17 which communicates with another passage 18 through which water is outputted to a bathtub (not shown). In this embodiment, the cold and hot water inlet chambers 11 and 13 are defined in a mediate section of the housing 10 and the first and second outlet chambers 15 and 17 are respectively defined in two ends of the housing 10. The cold water inlet chamber 11 is in communication with the hot water inlet chamber 13 through a first passage 21. The hot water inlet chamber 13 is in communication with the second water output chamber 17 through a second passage 22.

The valve stem 30 includes three spaced water sealing gaskets 31 mounted thereon. In the preferred embodiment, the diameters of each of the gaskets 31 are substantially identical to the diameter of the first output chamber 15, the diameter of the first passage 21 and the diameter of the second passage 22, and smaller than the diameter of the cold water chamber 11 and the diameter of the hot water chamber 13. One of the gaskets 31 can be located in the first water output chamber 15, thus blocking the communication between the first water output chamber 15 and the shower head. One of the gaskets 31 can be disposed in the first passage 21 thus blocking the communication between the cold water inlet chamber 11 and the hot water inlet chamber 13. One of the gaskets 31 can be located in the second passage 22, thus blocking the communication between the hot water inlet chamber 13 and the second water output chamber 17.

Figure 6:
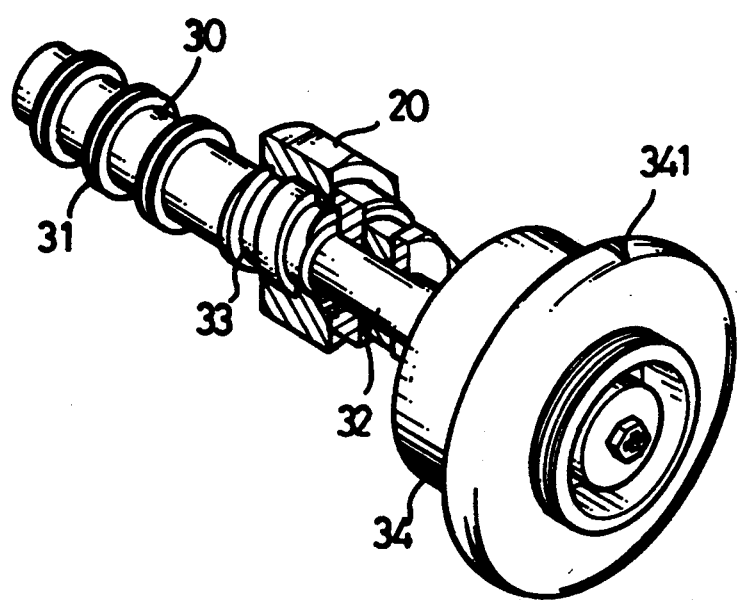
FIG. 6 is a perspective view, partly cut away, of a valve stem of the three way faucet in accordance with the present invention.

The housing 10 further has a seat 20 attached thereto in which seat 20 has inner threadings therein. The valve stem 30 comprises an end 32 extending beyond the housing 10 and a threaded section 33 engaged with inner threadings of the seat 20, as shown in FIG. 6. A knob 34 is attached to the end 32 of the valve stem 30 and is rotationally operable.

Figure 4:
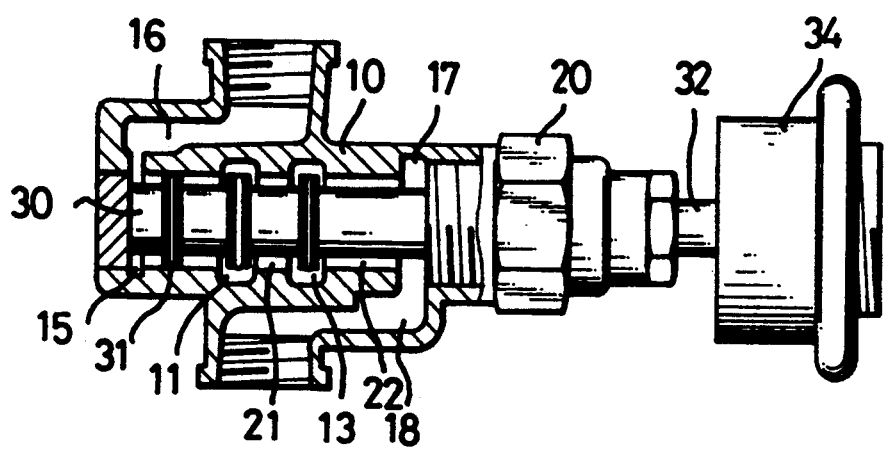
FIG. 4 is a view similar to FIG. 3 in which the faucet is in a position communicating with a bathtub.
Figure 5:
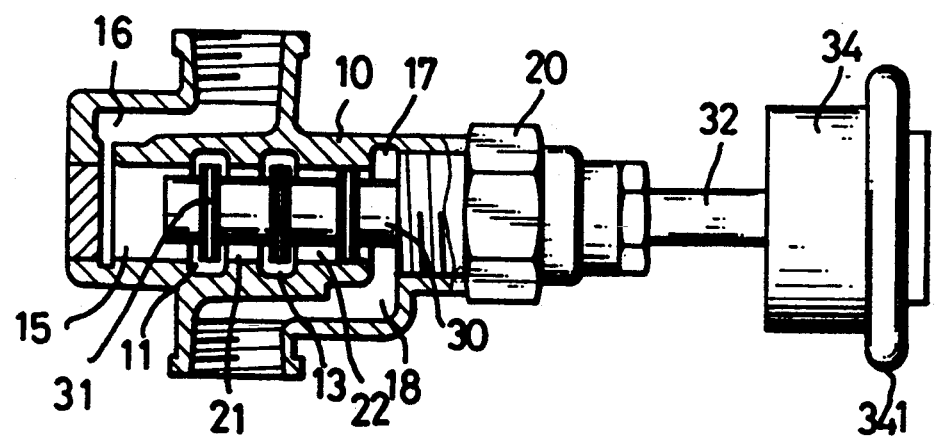
FIG. 5 is a view similar to FIG. 3 in which the faucet is in a position communicating with a shower head.

When the valve stem 30 is in a first position shown in FIG. 3, first one of the gaskets 31 is located in the first water output chamber 15, and a second one of the gaskets 31 is disposed in the first passage 21, and a third one of the gaskets 31 is located in the second passage 22, i.e., the chambers 11, 13, 15, and 17 are isolated from each other, such that no water is outputted. When the valve stem 30 is in a second position shown in FIG. 4 upon rotation of the knob 34 in a first direction, the first gasket is located in the first water output chamber 15, and the second gasket is located in the cold water inlet chamber 11, and the third gasket is located in the hot water inlet chamber 13, i.e., the first water output chamber 15 is isolated and the cold and hot water inlet chambers 11 and 13 and the second water output chamber 17 communicate with one another such that water is outputable to the bathtub via passage 18. When the valve stem 30 is in a third position shown in FIG. 5 upon rotation of the knob 34 in a second direction opposite to the above-mentioned first direction, the first gasket is located in the cold water inlet chamber 11, and the second gasket is located in the hot water inlet chamber 13, and the third gasket is located in the second water output chamber 17, i.e., the second water output chamber 17 is isolated and the cold and hot water inlet chambers 11 and 13 and the first water output chamber 15 communicate with one another such that water is outputable to the shower head via passage 16.

Preferably, the knob 34 includes an index, such as a notch 341 in a periphery thereof for providing a reference to indicate the first, second, and third positions.

According to the above, it is appreciated that the noise problem and tracing back problem of hot water when in the OFF position encountered in U.S. Pat. No. 4,718,128 are avoided.

Although the invention has been explained in relation to its preferred embodiment, it is to be understood that many other possible modifications and variations can be made without departing from the spirit and scope of the invention as hereinafter claimed.

I claim:

1. A three way faucet comprising:
a housing defining therein a cold water inlet chamber which communicates with a cold water source, a hot water inlet chamber which communicates with a hot water source, a first water output chamber which communicates with a shower head, a second water output chamber which communicates with a bathtub, a first passage in communication between said cold water inlet chamber and said hot water inlet chamber and a second passage in communication between said hot water inlet chamber and said second water output chamber;
a valve stem mounted in said housing; and
spaced first, second and third gaskets mounted on said valve stem, the first gasket being identical substantially to the first output chamber and smaller than the cold water chamber in diameter, the second gasket being identical substantially to the first passage and smaller than the cold and hot water chambers in diameter, the third gasket being identical substantially to the second passage and smaller than the hot water chamber in diameter;
wherein said first gasket is located in said first water output chamber, and said second gasket is disposed in said first passage, and said third gasket is located in said second passage when said valve stem is in a first position so that said chambers are isolated from each other, wherein said first gasket is located in said first water output chamber, and said second gasket is located in said cold water inlet chamber, and said third gasket is located in said hot water inlet chamber when said valve stem is in a second position so that said first water output chamber is isolated and said cold and hot water inlet chambers and said second water output chamber communicate with one another, said first gasket is located in said cold water inlet chamber, and said second gasket is located in said hot water inlet chamber, and said third gasket is located in said second water output chamber when said valve stem is in a third position so that said second water output chamber is isolated and said cold and hot water inlet chambers and said first water output chamber communicate with one another.

2. The three way faucet as claimed in claim 1 further comprising a seat with inner threadings therein, said valve stem comprising an end extending beyond said housing and a threaded section engaged with said inner threadings of said seat, a knob being attached to said end of said valve stem and rotationally operable between said first, second, and third positions to control output of water.

3. The three way faucet as claimed in claim 2 wherein said knob (34) includes an index thereon for providing a reference to indicate said first, second, and third positions.

4. The three way faucet as claimed in claim 2 wherein said cold and hot water inlet chambers are defined in a mediate section of said housing and said first and second outlet chambers are respectively defined in a pair of ends of said housing.

* * * * *